April 28, 1931. J. H. PETERSON 1,802,476
GRAIN DRIER AND GRADER
Filed May 22, 1928 2 Sheets-Sheet 1
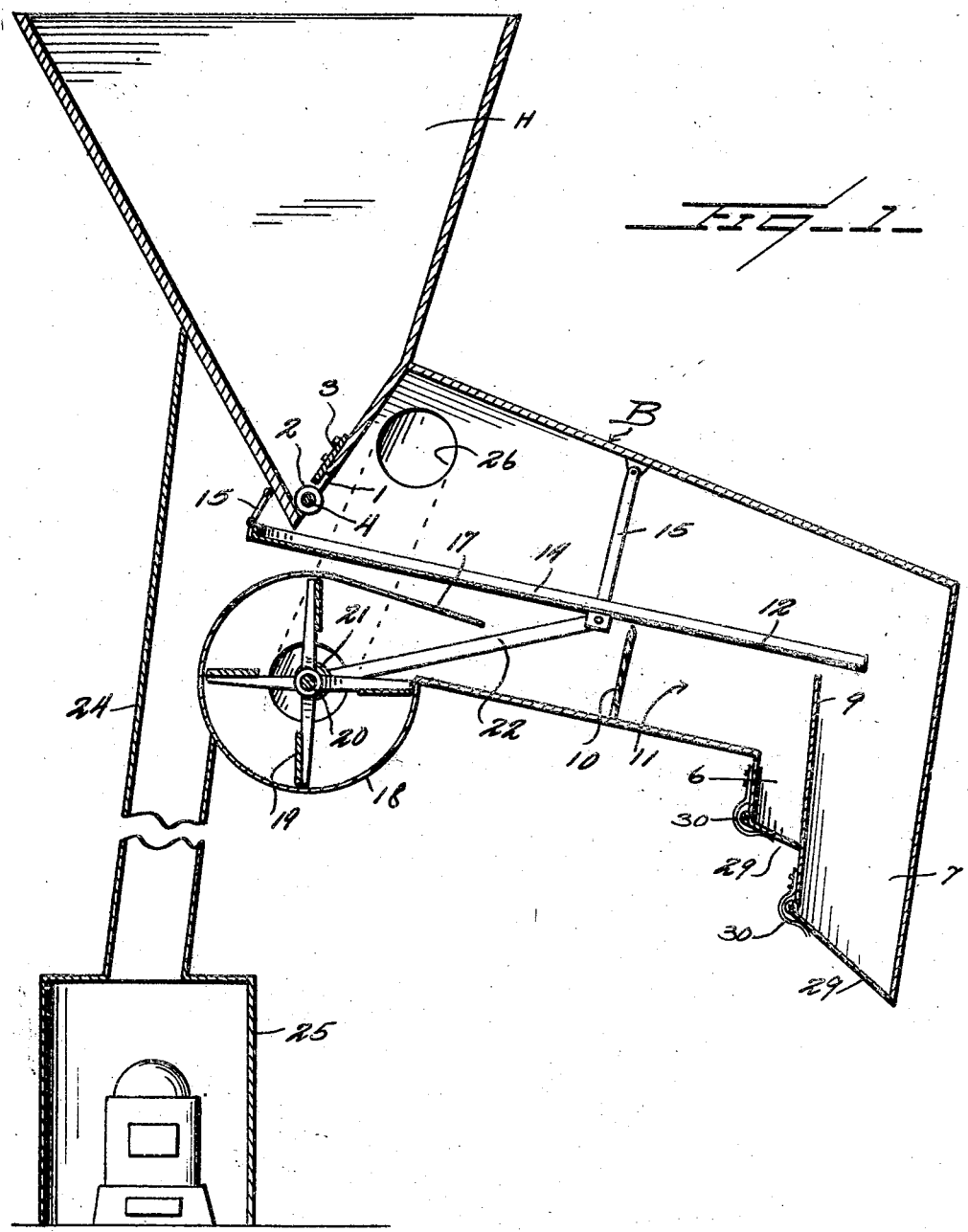

April 28, 1931. J. H. PETERSON 1,802,476
GRAIN DRIER AND GRADER
Filed May 22, 1928  2 Sheets-Sheet 2
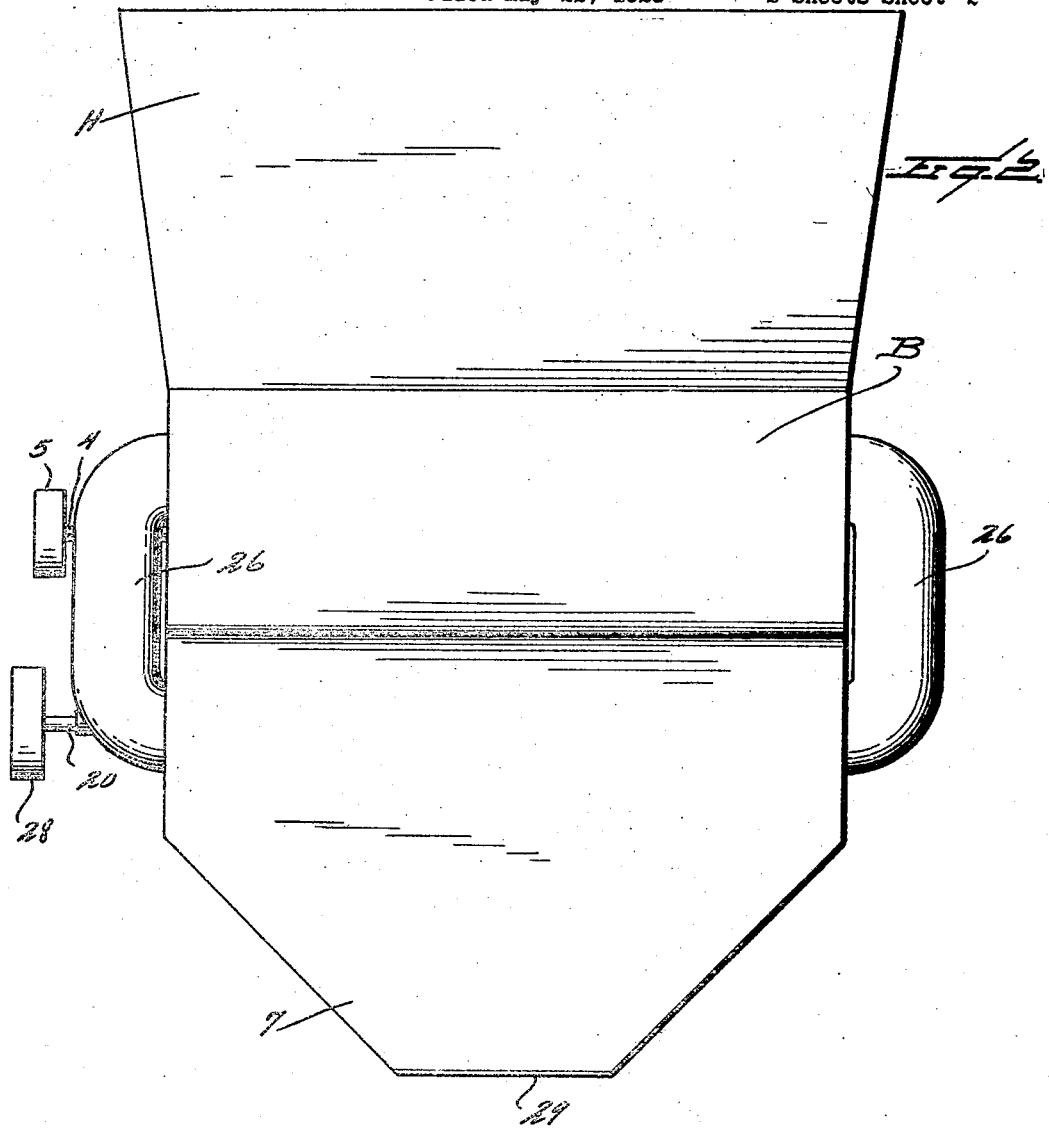
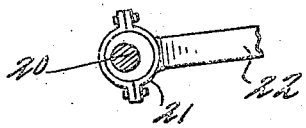
Inventor
J. H. Peterson
By Watson E. Coleman
Attorney Patented Apr. 28, 1931

1,802,476

UNITED STATES PATENT OFFICE

JOHN HARRY PETERSON, OF CATHAY, NORTH DAKOTA

GRAIN DRIER AND GRADER

Application filed May 22, 1928. Serial No. 279,758.

This invention relates to a grain drier and grader and it is an object of the invention to provide a device of this kind adapted for treatment of grain and to operate upon such grain in a manner to effectively dry the same to facilitate its storage and also to properly grade such grain.

Another object of the invention is to provide a device of this kind wherein the grain during its grading action is subjected to the action of heated air to dry the same and wherein means are provided to separately collect the full grain from the culls.

The invention consists in the details of construction and in the combination and arrangement of the several parts of my improved grain drier and grader whereby certain important advantages are attained and the device rendered simpler, less expensive and otherwise more convenient and advantageous for use, as will be hereinafter more fully set forth.

The novel features of my invention will hereinafter be definitely claimed.

In order that my invention may be the better understood, I will now proceed to describe the same with reference to the accompanying drawings, wherein:—

Figure 1 is a vertical longitudinal sectional view of a grain drier and grader embodying my invention;

Figure 2 is an end elevation thereof;

Figure 3 is a fragmentary detailed view of the shaker arm connection.

As disclosed in the accompanying drawings, H denotes a hopper of requisite capacity and which is adapted to be supported in any desired manner at a requisite height. The lower portion of the hopper is provided with a discharge opening 1 in which is mounted for rotation a force feed roller 2. Coacting with the discharge opening 1 and the roller 2 is a sliding gate or valve 3 for regulating the flow of the grain from the hopper through the discharge opening 1. The roller 2 is provided with a shaft 4 extending exteriorly of the hopper H and provided with a pulley 5 or the like whereby said roller may be driven at requiste peripheral speed.

The lower portion of the hopper H extends within the rear portion of an elongated bin B substantially V-shaped in cross section. This bin B is disposed on a predetermined downward incline with respect to the hopper H and at its outer or free end portion is provided with the two depending spouts 6 and 7 one arranged behind the other, the forward spout 7 being of a capacity materially greater than that of the rear spout 6. The front spout 7 is adapted to receive the full grain while the second spout 6 is adapted to collect the culls. The lower portion of the bin B immediately adjacent to the forward spout 7 is provided thereacross with a partition 9 providing means to prevent the culls from being received within the spout 7. The lower portion of the bin B at a point materially inward of the partition 9 is provided thereacross with a second partition 10, the space 11 between the partitions 9 and 10 forming a compartment with which the spout 6 communicates and which compartment is adapted to receive the culls or the like passing through the screening element 12 comprised in that portion of the grain pan 14 disposed over the compartment 11.

The grain pan 14 is of a length to normally extend rearwardly of the lower or discharge end of the hopper H so that the grain passing out through the discharge opening 1 will be properly received upon the pan. This pan is supported in desired position by the hangers 15 whereby the pan may be readily and conveniently oscillated to effect the requisite agitation of the grain thereon.

The lower rear portion of the bin B has in communication therewith a discharge nozzle 17 leading from a casing 18 in which is mounted a fan 19. The fan 19 comprises a supporting shaft 20 operatively supported by the end walls of the casing 18. The opposite end portions of the shaft 20 within the casing 18 and immediately adjacent to the ends thereof are provided with the eccentrics 21 with which are operatively engaged the shaker arms 22. These shaker arms 22 extend upwardly through the nozzle 17 into the bin B and are operatively connected with the grain pan 14 so that when the shaft 20 is in rotation the proper oscillation of the pan 14 will be effected.

The rear portion of the bin B is in communication with a downwardly disposed conduit 24 the lower end portion of which being suitably enlarged, as at 25, to house a suitable heating element. The bin B has in communication therewith, through the upper portion of its side walls and at a point in advance of but in relatively close proximity to the hopper H, the return pipes 26 which have communication with the opposite end portions of the fan casing 18.

The fan shaft 20 extends exteriorly of the casing 18 and said extended portion is provided with a pulley 28 or the like whereby the shaft may be suitably coupled with a desired source of power.

In practice, as the grain is delivered from the hopper H upon the pan 14 said grain will pass downwardly and forwardly over said pan, the culls being received within the compartment 11 and into the spout 6 while the full grain will be received within the spout 7. The lower or discharge ends of the spouts 6 and 7 are each normally closed by a downwardly swinging closure member 29 automatically maintained in its normal position through the instrumentality of the spring 30.

When a predetermined load is received upon the closure member 29 of either the spout 6 or 7, said closure member will swing downwardly into an open position effecting a discharge of such material whereupon it will automatically return to its normally closed position.

As the grain is passing along the bin B and over the pan 14, the same will be subjected to the action of the heated air maintained in continuous circulation through the instrumentality of the fan 19 whereby said grain is effectively dried and thus placing the same in the best possible condition for storage.

From the foregoing description it is thought to be obvious that a grain drier and grader constructed in accordance with my invention is particularly well adapted for use by reason of the convenience and facility with which it may be assembled and operated, and it will also be obvious that my invention is susceptible of some change and modification without departing from the principles and spirit thereof and for this reason I do not wish to be understood as limiting myself to the precise arrangement and formation of the several parts herein shown in carrying out my invention in practice except as hereinafter claimed.

I claim:—

1. A grain drier and grader of the class described comprising a bin, a hopper discharging therein, an oscillating pan within the bin and upon which the hopper discharges, a casing carried by the rear portion of the bin and discharging therein at a point below the pan, a fan mounted within the casing and including a shaft supported by opposed walls of the casing, an operative connection between said shaft and the pan for agitating the pan when the shaft is in rotation, a conduit in communication with the rear portion of the bin, a heating element arranged to discharge heated air into the conduit, and an air return pipe in communication with the rear upper portion of the bin and the fan casing.

2. A grain drier and grader of the class described comprising a bin, a hopper discharging therein, an oscillating pan within the bin and upon which the hopper discharges, means for vibrating the pan, means for creating a circulation of heated air within the bin and longitudinally under the pan, a pair of spouts depending from the forward end of the bin, normally closed closure members coacting with said spouts, said pan discharging into one of the spouts, and a screening means carried by the pan delivering into the second spout.

3. An apparatus of the character described, comprising an elongated bin, a hopper discharging into said bin at one end thereof, an oscillating pan within the bin in a position to receive material from the discharge opening of said hopper, means for oscillating said pan, a heating element, and means for concentrating heat from said element against the hopper wall at the discharge opening and for simultaneously introducing the heat into the bin beneath the discharge opening of the hopper.

4. An apparatus of the character described, comprising an elongated bin, a hopper discharging into said bin at one end thereof, an oscillating pan within the bin in a position to receive material from the discharge opening of said hopper, means for oscillating said pan, a heating element, means for concentrating heat from said element against the hopper wall at the discharge opening and for simultaneously introducing the heat into the bin beneath the discharge opening of the hopper and beneath the pan, and means for collecting heated air from the upper part of the bin adjacent the hopper and conducting it to the lower part for re-introduction thereinto.

5. An apparatus of the character described, comprising an elongated bin, a hopper having a discharge opening arranged to introduce material into one end of the bin, an oscillating pan extending longitudinally within the bin and having one end underlying the discharge opening of the hopper, a blower arranged to introduce air into the bin at a point beneath the hopper and pan and to direct it toward the opposite end of the bin, a heater, and means for concentrating heat from said heater against the lower portion of the hopper and to simultaneously introduce heat into the bin between the hopper and blower.

6. An apparatus of the character described, comprising an elongated bin, a hopper having a discharge opening arranged to introduce material into one end of the bin, an oscillating pan extending longitudinally within the bin and having one end underlying the discharge opening of the hopper, a blower arranged to introduce air into the bin at a point beneath the hopper and to direct it toward the opposite end of the bin, a heater, means for concentrating heat from said heater against the lower portion of the hopper and to simultaneously introduce heat into the bin between the hopper and blower, and means for extracting heated air from the upper portion of said bin above the hopper inlet and introducing it into the blower for injection into the bin thereby.

7. An apparatus of the character described, comprising an elongated closed bin, a hopper discharging into one end of said bin, an oscillating pan extending longitudinally through the bin and having one end disposed beneath said hopper, said bin at its other end being formed to provide a pair of downwardly directed chutes, one being arranged to receive material directly from the end of the pan, a screen forming a portion of the bottom of said pan and overlying the other chute, a blower in the lower portion of the bin beneath the hopper and the pan and designed to direct a blast of air forwardly in the bin beneath the pan, a heater, means for discharging heated air from said heater directly against the lower portion of said hopper and introducing the heated air into the bin between the pan and blower, and an air conducting pipe connecting the upper part of said bin with said blower whereby air extracted from the bin may be returned thereto through the blower.

8. An apparatus of the character described, comprising an elongated bin, a pair of downwardly directed chutes arranged in side by side relation at one end of the bin and opening thereinto, a hopper disposed at the opposite end of the bin and having one wall extended downwardly over and closing the upper portion of the adjacent end of the bin, an oscillating pan extending longitudinally through the bin and having one end disposed beneath said hopper, a casing forming a part of the bottom wall of the bin directly beneath said hopper and having a wall portion extending longitudinally in the bin beneath the pan and forming with a portion of the bottom wall of the bin an air passage directed toward said chutes, said wall portion being spaced from the lower end of said hopper, a fan within said casing, a heating element, and a hot air conducting pipe leading from said heating element and having one end covering a portion of a wall of the hopper and the area between the lower end of the hopper and the said wall portion of the casing, said pan being arranged to discharge material from one end into one of said chutes and having a foraminous bottom portion overlying the other of said chutes.

In testimony whereof I hereunto affix my signature.

JOHN HARRY PETERSON.